United States Patent [19]
Klee et al.

[11] 3,840,310
[45] Oct. 8, 1974

[54] MOLD FOR MAKING SHOES WITH MOLDED BOTTOMS

[75] Inventors: Werner Klee; Peter Rafalski, both of Achim; Helmut Wessolowski, Lahausen, all of Germany

[73] Assignee: Desma-Werke G.m.b.H., Achim bei Bremen, Germany

[22] Filed: Mar. 29, 1973

[21] Appl. No.: 345,858

[30] Foreign Application Priority Data
May 18, 1972 Germany............................ 2224231

[52] U.S. Cl.................... 425/119, 249/91, 249/119, 425/129 S
[51] Int. Cl......... B29c 7/00, B29f 1/14, B29h 5/12, B29h 7/08
[58] Field of Search ............. 425/119, 129; 248/112

[56] References Cited
UNITED STATES PATENTS

| | | | |
|---|---|---|---|
| 417,176 | 12/1889 | Haines............................... | 249/112 |
| 459,313 | 9/1891 | Simpson............................ | 249/112 |
| 573,455 | 12/1896 | Ervin ................................. | 249/112 |
| 600,565 | 3/1898 | Wallace ............................. | 249/112 |
| 3,045,282 | 7/1962 | Heideman........................... | 425/119 |
| 3,299,476 | 1/1967 | McIlvin.............................. | 425/146 |
| 3,314,640 | 4/1967 | Snow ................................. | 425/119 X |
| 3,444,591 | 5/1969 | Becka et al......................... | 425/119 |
| 3,474,496 | 10/1969 | Klee.................................... | 425/119 |
| 3,504,079 | 3/1970 | Hall ................................... | 425/119 X |
| 3,759,481 | 9/1973 | Scott................................... | 249/112 X |

*Primary Examiner*—J. Howard Flint, Jr.
*Attorney, Agent, or Firm*—G. Eugene Dacey

[57] ABSTRACT

A metal mold for forming and attaching a shoe sole to the bottom of a lasted upper comprising a bottom part, a surrounding side part open at the top across which a lasted shoe upper is adapted to be supported and a lining disposed within the cavity constituted by the bottom and surrounding side part comprised of a plastic material which has been molded to a pattern of the bottom to be formed so as to correspond to the exact configuration of the bottom. The lining is detachably attached to the mold to enable replacing it with a lining of a different configuration to adapt the mold to the manufacture of shoes with a variety of bottom formations, and when employed in conjunction with a split mold, that is, one in which the side part is formed in two halves so as to be movable laterally with respect to the bottom part, the side parts of the lining are integrally connected at the heel end to enable moving them away from each other with the lateral movement of the side parts of the mold. The lining is preferably comprised of polyurethane resin and is relatively thin so that the heat from the molded material diffuses quickly to the surrounding metal of the mold.

1 Claim, 3 Drawing Figures

MOLD FOR MAKING SHOES WITH MOLDED BOTTOMS

BACKGROUND OF THE INVENTION

The invention relates to a mold, especially casting mold, for the manufacture of objects from moldable material in a molding cavity, especially for the manufacture of shoes soles from plastic with simultaneous shape-molding to a shoe upper drawn onto a last.

Casting molds and injection casting molds for shoe technologys with which shoe soles are molded from castable and injection castable material and simultaneously are shape-molded to a lasted shoe uppers usually consist of lateral mold parts in the form of a longitudinally-split, i.e., two-piece lateral frame, a last to hold the shoe upper and a bottom die which can be displaced in height. The two lateral mold parts or lateral frame halves can be moved apart and together by translational motion. The aforesaid mold parts are made of a special metal. Because of the required accuracy of fit, the manufacture of these mold parts is naturally difficult and expensive. Beyond that, a special difficulty arises from the required machining of the surfaces of the mold parts which border the mold cavity, especially when it is desired to have particular surface structures, e.g., leather imitations, on the mold part, i.e., on the shoe sole.

The underlying task of the invention is to propose a novel mold which is particularly intended for the manufacture of shoe soles with simultaneous shape-molding to a shoe upper and which can be manufactured at low expense in comparison with molds known heretofore.

SUMMARY

The mold according to the invention is characterized in that at least a part of the mold made of rigid material, particularly metal, consists of an overlay made of easily moldable material, particularly plastic, which borders the mold cavity on the side facing the object to be manufactured.

Accordingly, the mold according to the invention consists of mold parts which each have two pieces. Namely, each mold part is formed of a rigid, shape-holding part, particularly of metal, and an overlay made of easily moldable material, preferably plastic, which faces the casting. The mold is thereby altogether sturdy and rigid. However, the surfaces or parts which shape the casting can be manufactured at low expense with plastic overlays by pouring or spraying on a model of the molded article to be manufactured. The parts bordering the mold cavity thus very exactly have the desired contours of the molded article.

The overlay made of plastic or the like is joined to the mold parts made of metal in such a manner that the expansions occurring in plastic due to heating are coped with. The wall thickness of the overlay is small in comparison with the mold parts made of metal, so that the heat can be rapidly conducted away from the plastic overlays.

Accordingly to an additional feature of the invention, the overlays are attached in a replaceable manner to the metal base mold parts of the mold, so that only the overlays have to be replaced for the manufacture of differently shaped molded articles, e.g., in the event of a fashion change.

In a particularly advantageous casting mold or injection casting mold for the manufacture and shape-molding of shoe soles, there is provided a one-piece overlay for the lateral mold parts or frame halves which are separated from one another. The lateral mold parts preferably are joined to one another in the region of the heel by an elastic bridge of the overlay so that the mold is in one piece in this region and thus no seams appear on the molded article. The mold is then opened by bending up from the opposite side, i.e., for example, from the shoe tip.

Further details are illustrated in the following by means of embodiments represented in the drawings.

Figure 1:
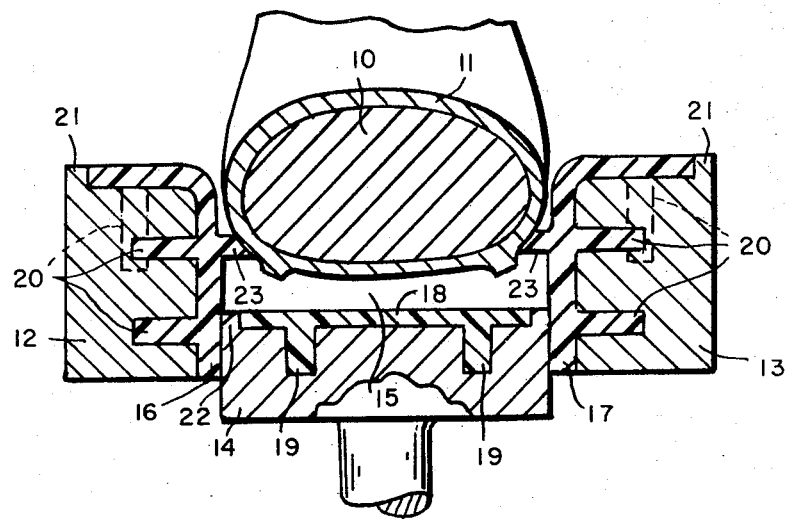
FIG. 1 is a mold according to the invention for the manufacture and shape-molding of shoe soles in cross-section.

In the drawings, the invention is illustrated in the application with an injection-casting mold or casting mold for the manufacture and simultaneous shape-molding of shoe soles onto shoe uppers. In particular, the mold can be utilized for the processing of polyurethane plastics.

In the usual manner, the mold consists in principle of a last 10 onto which is drawn a shoe upper 11. The last 10 with the shoe upper 11 is inserted onto or into lateral mold parts which, in the illustrated embodiment, consist of the frame halves 12 and 13. For the manufacture of a specially shaped shoe, the frame halves 12 and 13 can be drawn up onto the shoe upper 11 in the region of the heel, so that a heel cap resting against the upper 11 is molded together (with the rest of the sole) in this region. Last 10 or shoe upper 11 and frame halves 12 and 13, together with a raisable and lowerable base die 14 guided between the frame halves 12 and 13, enclose a mold cavity 15 to hold the material from the shoe sole.

According to the invention, certain mold parts, namely the frame halves 12 and 13 and/or the base die 14, are provided with overlays 16, 17, 18 made of easily moldable material. These overlays 16, 17, 18 preferably are made of plastic, indeed of a PUR synthetic resin plastic. The overlays 16, 17, 18 are so arranged that they at least predominantly border the mold cavity 15.

Figure 2:
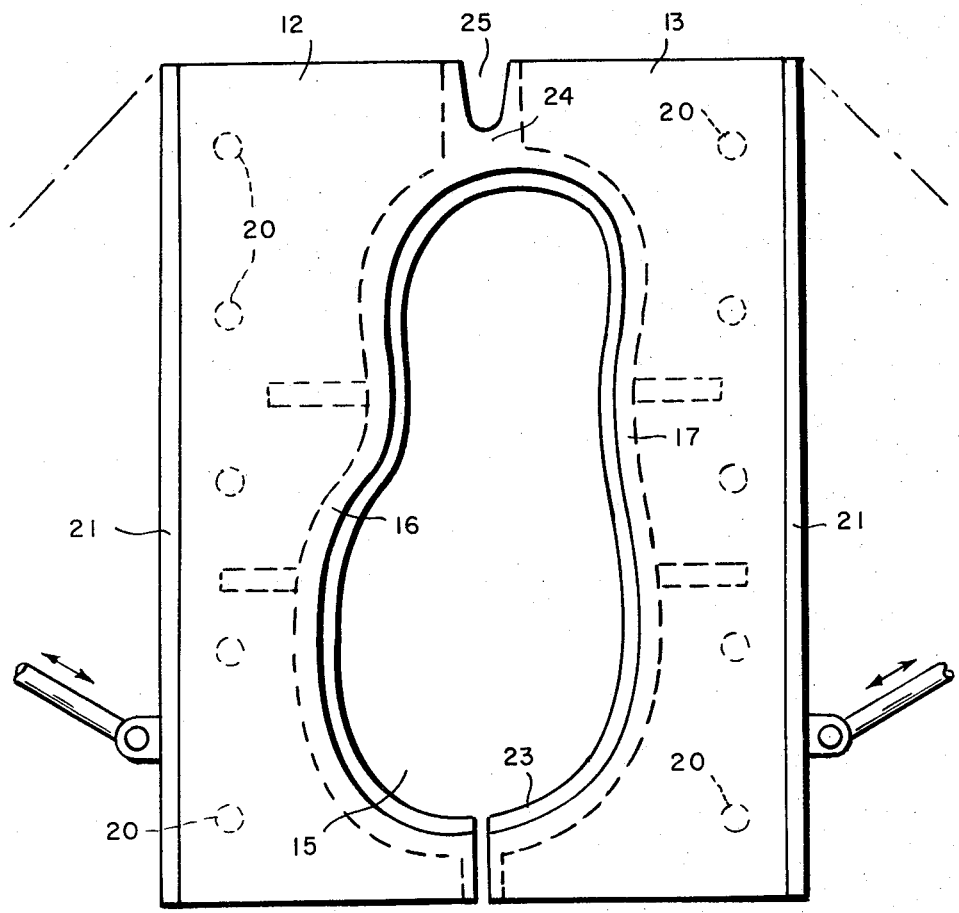
FIG. 2 is a horizontal projection corresponding to FIG. 1 but without the last.
Figure 3:
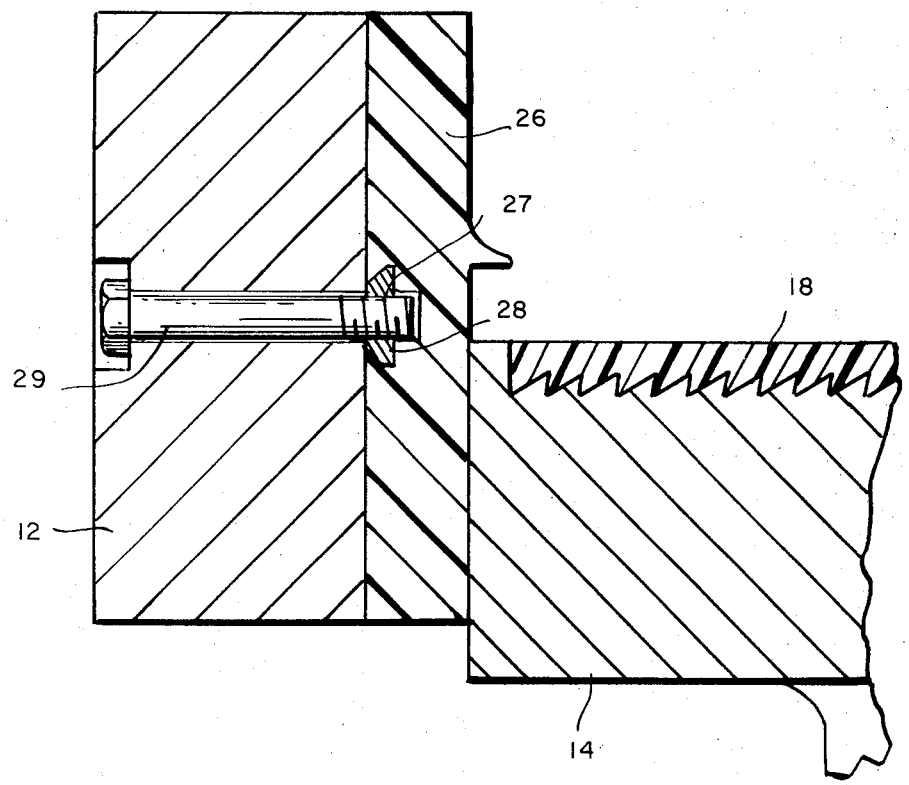
FIG. 3 is a partial cross-section of another embodiment of the invention.

The design of the overlays 16, 17, 18 is such that they have a comparatively small wall thickness in comparison with the mold parts 12, 13 and 14 made of metal. The heat from these overlays can thereby be conducted away rapidly. The overlays 16, 17, 18 are joined by special means to the mold parts which support them in such a manner that relative motions cannot occur. In the embodiments of FIGS. 1 and 2 there is provided in the mold parts 12, 13 and 14 a multiplicity of borings into which the stud-type bosses 19 and 20 of the overlays 16, 17, 18 penetrate as they are produced and so produces a form-locked connection with the mold parts supporting them. In addition to this or instead of this, the surface of the mold parts 12, 13, 14 made of metal or the like can be built with elevations and depressions (see FIG. 3) by means of which there is likewise produced an improved adhesion of the overlays to the mold parts. At the boundary regions, the mold parts 12, 13, 14 are provided with shoulders 21 and 22 by which the overlays 16, 17, 18 are laterally enclosed. The overlays are more suitably produced in that the material itself in a flowable or moldable state is casted around and shape-molded to a pattern of the molded article, namely of the shoe or shoe sole. After the material sets, the overlays have the exact contours of the molded article to be mmanufactured. In so doing, a sealing lip 23 which is usually required in such molds is also molded. the shoe upper 11 lies against this sealing lip. Due to the greater elasticity relative to metal, adequate sealing can be achieved with less danger of damaging the upper 11.

In the preferred embodiments of FIGS. 1 and 2, the overlays 16 and 17 are joined into a one-piece workpiece by an elastic bridge 24 in the heel region. The mold parts 12 and 13 have an enlarged separation from one another here. This and also a recess 25 introduced into the overlays 16 and 17 from the back insures an easy swinging-apart of the mold parts 12 and 13 provided with the overlays 16 and 17 when the elastic bridge 24 is deformed. With this mold the seam mark which otherwise would be present in the heel region is avoided, which is particularly advantageous in shoes having drawn-up heel caps.

At the shoe tip, the opposing separating surfaces of the metal frame halves 12 and 13 are provided with a coating of the overlays 16 and 17, so that in the closed position an increased degree of sealing is provided here due to the elasticity.

With the molds according to the invention, an easy replacement of the parts determining the shape of the molded article is possible. In the embodiment according to FIGS. 1 and 2 the overlays 16, 17 and 18 can be removed and replaced by newly casted-on overlays. In the embodiment according to FIG. 3, the overlays are detachably fastened to the mold parts. As an example, mold part 12 is provided with an overlay 26 in which is embedded an anchoring member, e.g., an anchoring plate 28 with a tapehole 27. The anchoring plate 28 makes possible the detachable fastening of the overlay 26 by means of a threaded bolt 29 passed through the mold part 12. A multiplicity of such anchorings are distributed over the region of the overlay 26.

The form-locking connection of the overlays to the mold parts supporting them can be effected in different ways, in particular also by elevations and/or depressions with undercuts on the mold parts.

In the claims the base die 14 and frame halves 12 and 13 are designated as a bottom wall or part and as surrounding side wall or part and the overlays 16, 17 and 18 are designated as a lining or lining member.

It should be understood that the present disclosure is for the purpose of illustration only and that this invention includes all modifications and equivalents falling within the scope of the appended claims.

We claim:

1. A mold comprising a bottom part and surrounding side parts divided medially and open at the top and bottom such that the bottom part may be moved upwardly within the surrounding side parts, said bottom and side parts bring comprised of metal and plastic lining members attached to the respective inner sides of the bottom and side parts, the inner surface of which corresponds in exact configuration to the bottom to be formed wherein a web integrally connects the plastic lining members attached to the side parts at the heel end, and said web contains a notch constituting a hinge which permits lateral separation of the side parts of the lining.

* * * * *